(12) United States Patent
Jun et al.

(10) Patent No.: US 7,826,410 B2
(45) Date of Patent: Nov. 2, 2010

(54) METHOD FOR UPDATING DNS ADDRESS IN MOBILE IP TERMINAL

(75) Inventors: Sun-Mi Jun, Daejeon (KR); Nam-Hoon Park, Daejeon (KR)

(73) Assignees: Samsung Electronics Co., Ltd, Suwon-Si (KR); Electronics and Telecommunications Research Institute, Daejeon (KR); KT Corporation, Seongnam (KR); SK Telecom Co., Ltd, Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 638 days.

(21) Appl. No.: 11/721,148

(22) PCT Filed: Oct. 26, 2005

(86) PCT No.: PCT/KR2005/003571

§ 371 (c)(1),
(2), (4) Date: Jun. 7, 2007

(87) PCT Pub. No.: WO2006/062290

PCT Pub. Date: Jun. 15, 2006

(65) Prior Publication Data

US 2009/0274114 A1    Nov. 5, 2009

(30) Foreign Application Priority Data

Dec. 10, 2004    (KR)   ............... 10-2004-0104459

(51) Int. Cl.
*H04W 4/00* (2009.01)
*H04W 36/00* (2009.01)
*G06F 15/173* (2006.01)
*G06F 15/16* (2006.01)

(52) U.S. Cl. ............... 370/328; 455/435.1; 455/436; 370/331; 709/220; 709/228

(58) Field of Classification Search ............... 370/328, 370/331; 455/435.1, 436; 709/220, 228
See application file for complete search history.

(56) References Cited

U.S. PATENT DOCUMENTS 6,286,045 B1 *   9/2001   Griffiths et al. ............. 709/224

(Continued)

FOREIGN PATENT DOCUMENTS

WO    02/082207 A2    10/2002

OTHER PUBLICATIONS

Jaehoon J., et al. "The Autoconfiguration of Recursive DNS Server and the Optimization of DNS Name Resolution in Hierarchical Mobile IPv6", 4 pages.

(Continued)

*Primary Examiner*—Ajit Patel
*Assistant Examiner*—Ariel Balaoing
(74) *Attorney, Agent, or Firm*—Jefferson IP Law, LLP

(57) ABSTRACT

A method for updating a domain name server (DNS) address by obtaining the DNS address when an IP address is allocated by using a mobile IP address in a mobile terminal using the portable interne based on a wireless mobile network is provided. In the method at least one DNS address connected to the wireless mobile network is sampled (S400), a roundtrip delay to the respective sampled DNSs is calculated (S450), a DNS address having a minimum roundtrip delay is selected (S460), and a DNS address of the mobile terminal is updated to be the selected DNS address (S500).

8 Claims, 4 Drawing Sheets

U.S. PATENT DOCUMENTS

| | | |
|---|---|---|
| 6,795,858 B1 | 9/2004 | Jain et al. |
| 6,810,411 B1 * | 10/2004 | Coughlin et al. ............ 709/203 |
| 2002/0145993 A1 * | 10/2002 | Chowdhury et al. ........ 370/338 |
| 2004/0153548 A1 * | 8/2004 | Latvakoski et al. ......... 709/228 |
| 2004/0266434 A1 * | 12/2004 | Lehtinen et al. ............. 455/436 |

OTHER PUBLICATIONS

Droms R., "DNS Configuration options for Dynamic Host Configuration Protocol for IPv6 (DHCPv6)", pp. 1-7, Dec. 2003.

* cited by examiner

[Fig. 1]
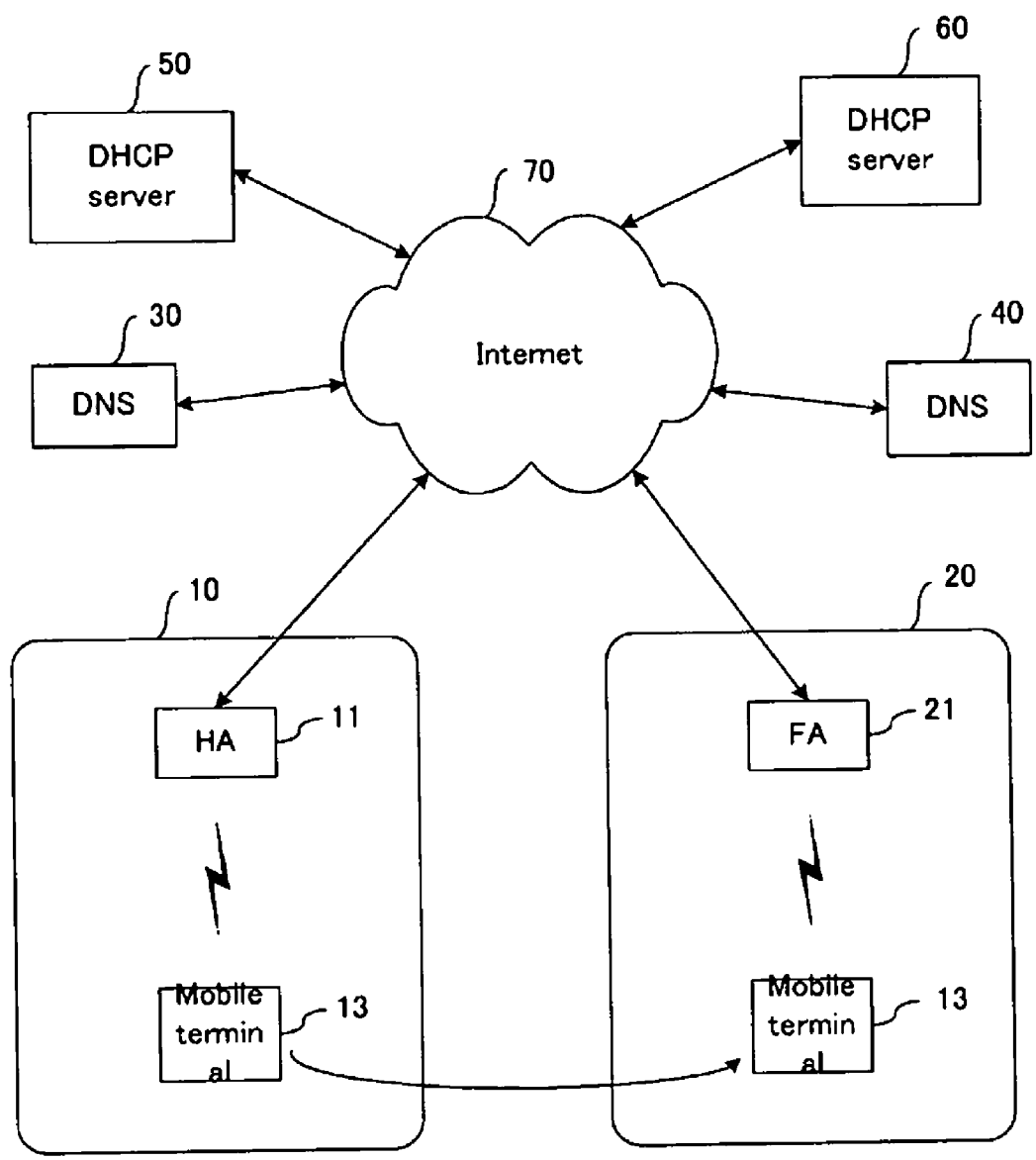

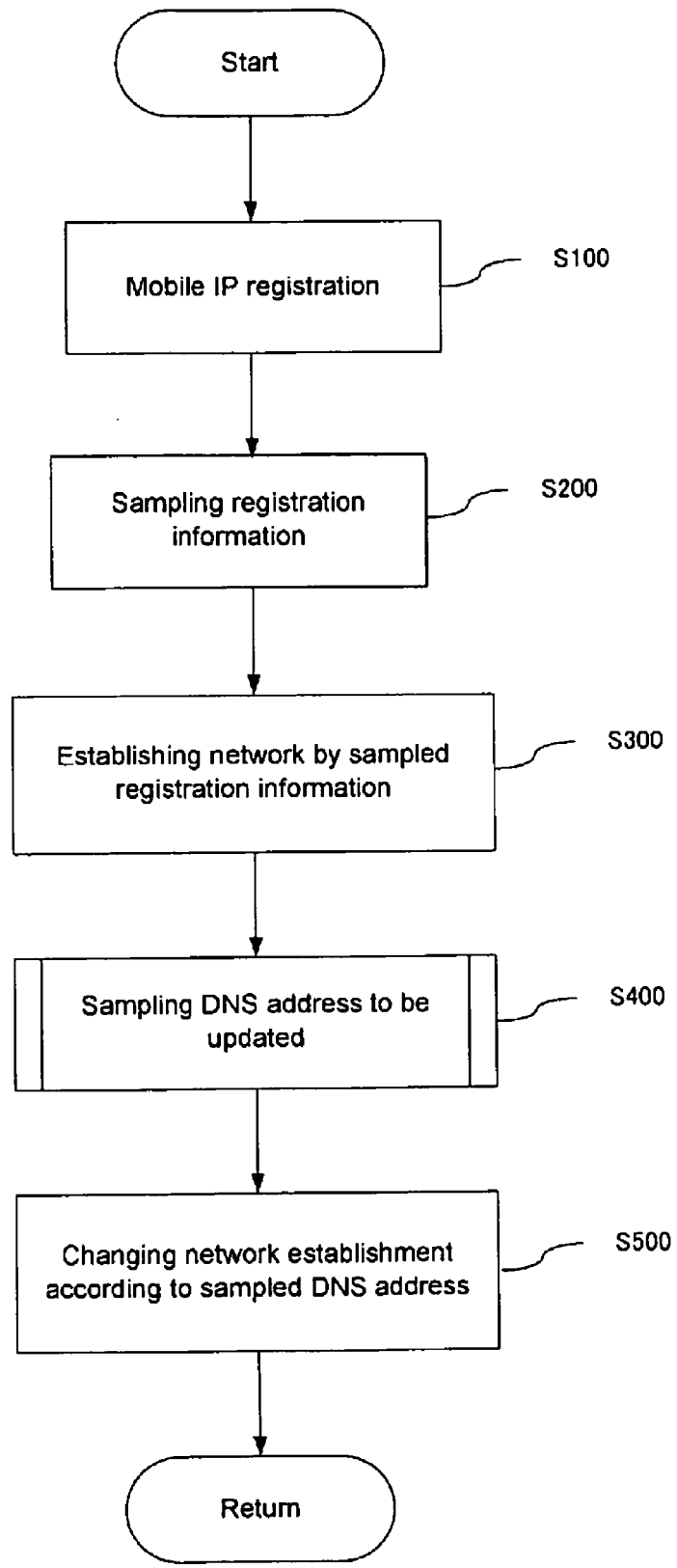
[Fig. 2]

[Fig. 3]
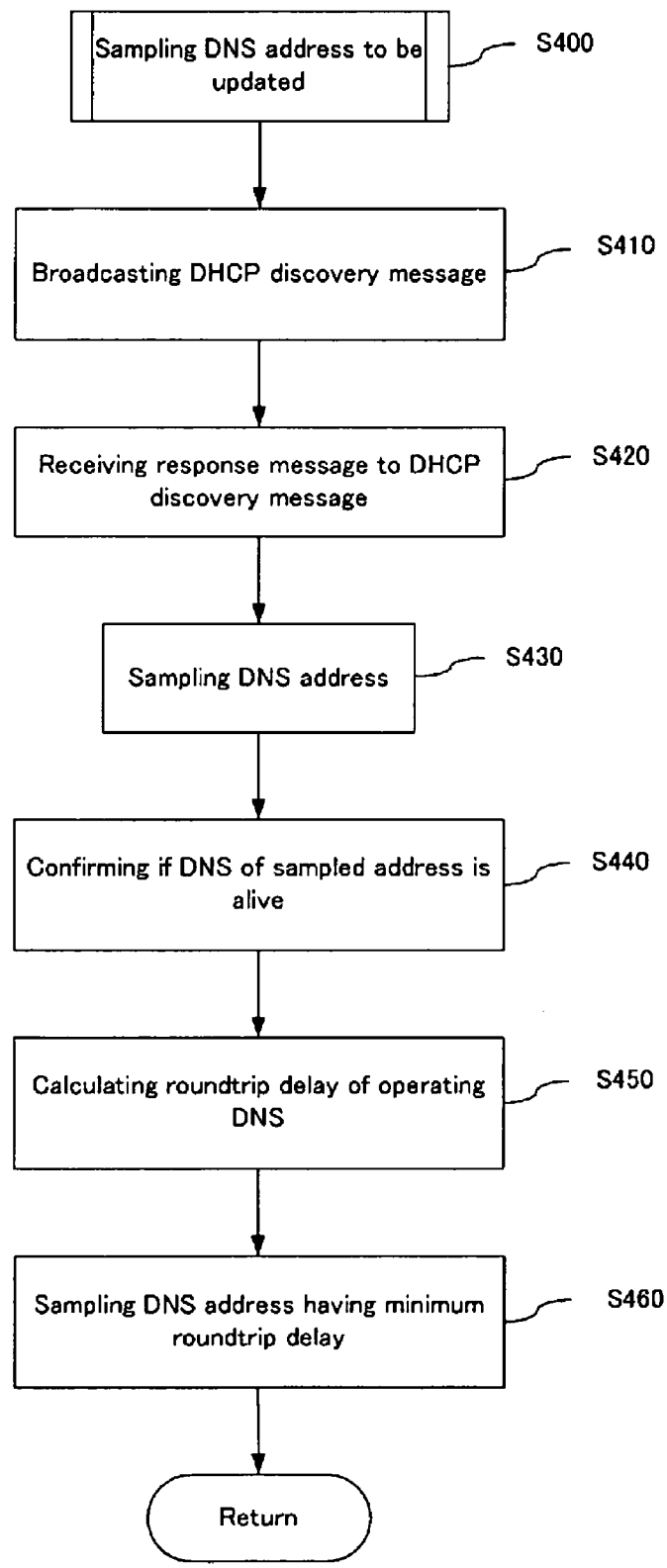

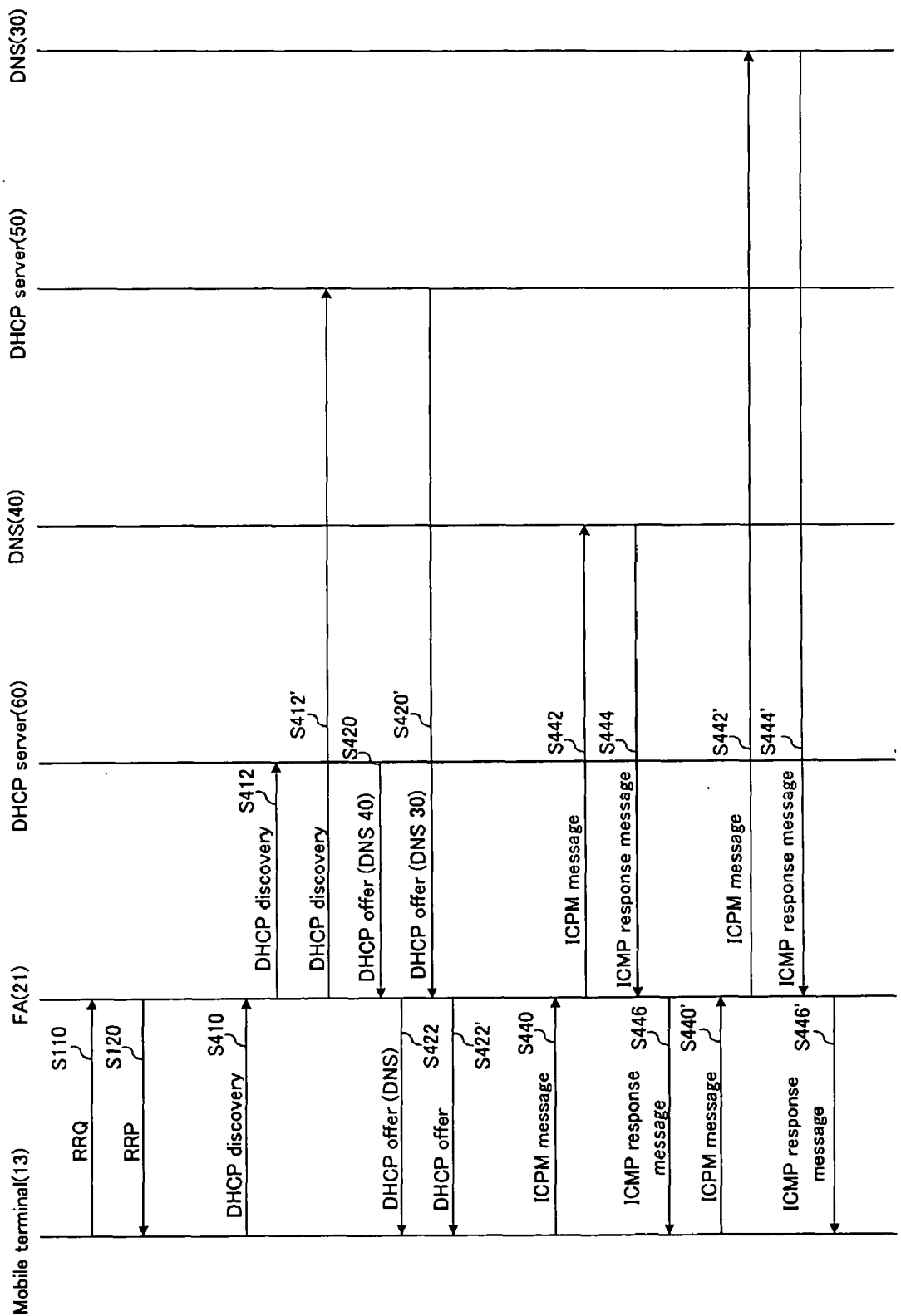
[Fig. 4]

METHOD FOR UPDATING DNS ADDRESS IN MOBILE IP TERMINAL

TECHNICAL FIELD

The present invention relates to a mobile terminal using a mobile internet protocol (IP). More particularly, the present invention relates to a method for updating a domain name server (DNS) address by obtaining the DNS address when an IP address is allocated by using a mobile IPv4 in a mobile terminal using the portable Internet based on a wireless mobile network.

BACKGROUND ART

In general, a mobile Internet protocol (IP) is a protocol developed to support frequent movement of mobile nodes. It has been suggested and standardized in request for comments (RFC) 2002 by an Internet engineering task force (IETF) mobile IP working group. In the above mobile IP environment, when a mobile terminal registers an address obtained in a current network to a home agent (HA) when accessing a remote network from outside, the HA transmits data to the remote network. Such a mobile IP standard includes mobile IP agents and mobile nodes, and the mobile IP agents perform a virtual routing service for routing packets to a registered mobile terminal.

The mobile terminal is required to be informed of an IP address of a service providing system. However, IP addresses are usually given in digits, and therefore it is difficult for users to memorize the numbers. Accordingly, domain names formed by characters which are easily memorized by the users are provided.

A domain name server (DNS) includes information on the IP address of the service providing system and a corresponding domain address, and provides an environment for converting a service requested by a user IP system as a domain name into an IP address. Accordingly, a DNS process is necessarily performed in an internet service.

In addition, a conventional mobile terminal has a configuration using a DNS directly inputted by a user. Accordingly, there is a problem in that an internet service is delayed according to a distance between a mobile terminal requesting the internet service and the DNS since the mobile terminal is also required to receive the IP address by accessing the DNS determined by the user when the mobile terminal using the mobile IP guaranteeing mobility moves around various networks.

While receiving an IP address, a gateway, and a router address from a mobile agent when the mobile terminal performs a mobile IP registration by using a mobile IPv4 message, the mobile terminal may not update the DNS address since it does not include an index for requesting the DNS address in a standard message format.

PCT Publication No. WO 02/082207 entitled "Discovering an address of a name server" discloses a method for providing a mobile terminal with DNS address information, in which the IP address of the DNS is received by changing contents of a standard registration reply message of the mobile IP or by using an internet protocol control protocol (IPCP) message in the mobile communication network having a packet service node for establishing a session with the mobile terminal. However, in this patent, an additional message for providing the DNS information is problematically required to be defined since the DNS EP address is received by defining a predetermined authentication server and a message.

The above information disclosed in this Background section is only for enhancement of understanding of the background of the invention, and therefore it may contain information that does not form the prior art that is already known in this country to a person of ordinary skill in the art.

DISCLOSURE OF INVENTION

Technical Problem

The present invention has been made in an effort to provide a method for updating a DNS address in a mobile terminal by obtaining DNS address information without adding an additional predetermined message.

Technical Solution

In an exemplary method for updating a domain name server (DNS) address of a mobile terminal in a wireless mobile network based on a mobile internet protocol (IP) according to an embodiment of the present invention, a) at least one DNS address connected to the wireless mobile network is sampled, b) a roundtrip delay to the respective sampled DNSs is calculated, c) a DNS address having a minimum roundtrip delay is selected, and d) a DNS address of the mobile terminal is updated to be the selected DNS address.

Here, the message used for sampling the DNS address is a dynamic host configuration protocol (DHCP) discovery message formed in a DHCP message format, in which an option for requesting a DNS address is established.

The roundtrip delay in b) is calculated by transmitting and receiving an internet control message protocol (ICMP) message for the DNS address sampled in a).

ADVANTAGEOUS EFFECTS

According to the exemplary embodiment of the present invention, a DNS is changed to be used according to a change of the location of a mobile terminal due to a mobile IP in a wireless mobile network.

Accordingly, transmission delays caused by a DNS request may be reduced when various internet services required for the DNS request are used.

BRIEF DESCRIPTION OF THE DRAWINGS

FIG. 1 shows a diagram for representing a mobile internet protocol (EP) system according to an exemplary embodiment of the present invention.

FIG. 2 shows a flowchart for representing a DNS address updating method in a mobile terminal according to an exemplary embodiment of the present invention.

FIG. 3 shows a flowchart for representing a process for sampling a DNS address to be updated.

FIG. 4 shows a diagram for representing a DNS address updating method applied to the mobile IP system shown in FIG. 1.

BEST MODE FOR CARRYING OUT THE INVENTION

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a mobile terminal capable of updating a domain name server (DNS) address according to an exemplary embodiment of the present invention will be described with reference to the figures.

FIG. 1 shows a diagram for representing a mobile internet protocol (EP) system according to an exemplary embodiment of the present invention.

As shown in FIG. 1, the mobile IP system according to the exemplary embodiment of the present invention includes a home network 10 in which a mobile terminal 13 is initially registered and a visiting network 20 to which the mobile terminal 13 moves.

The home network 10 includes a home agent (HA) 11 for routing the mobile terminal 13 in the home network 10 and performing an operation relating to the mobile IP, and the visiting network 20 includes a foreign agent (FA) 21 for routing the mobile terminal 13 in the visiting network 20 and also performing the operation relating to the mobile IP.

In addition, a plurality of DNSs 30 and 40 for managing a domain name and a plurality of dynamic host configuration protocol (DHCP) servers 50 and 60 for dynamically allocating the IP are connected to the internet 70 to which the home network 10 and the visiting network 20 are connected in common.

For convenience of descriptions, it will be assumed that the mobile terminal receives a service from the HA 11 by initially subscribing to the home network 10, and uses the DNS 30 to receive an IP address of a domain name in the exemplary embodiment of the present invention.

In the environment assumed as above, when moving to the visiting network 20 and receiving an internet service through the FA 21, the mobile terminal 13 obtains an actual IP address by requesting the predetermined DNS 30 about the address. However, in this case, a service delay occurs since a DNS message is transmitted and received over a far distance between the visiting network 20 and the DNS 30.

Accordingly, in the exemplary embodiment of the present invention, when the mobile terminal 13 moves to the visiting network 20 in the above environment, a service is received by establishing an address of the DNS 40 over a short distance to the visiting network 20 in which a service delay caused by the DNS message is short.

A method for updating a DNS address in the mobile terminal according to the exemplary embodiment of the present invention will now be described with reference to FIG. 2 to FIG. 4.

The mobile terminal 13 performs mobile IP registration in step S100 in order to use a service in the visiting network 20 when the mobile terminal is to receive the service by moving from the home network 10 to the visiting network 20.

In further detail, when the mobile terminal 13 transmits a registration request (RRQ) message for requesting the mobile IP registration in the visiting network 20 to the FA 21 in step S110, the FA 21 allows the registration in step S 120 by transmitting a registration reply (RRP) message including IP and gateway address information used by the mobile terminal 13 to the mobile terminal 13.

Accordingly, the mobile terminal 13 samples registration information, in step S200, including the IP and gateway address information in the RRP message transmitted from the FA 21, and establishes a network for using the internet service in the visiting network 20 by using the sampled registration information in step S300.

As the mobile terminal 13 moves to the visiting network 20, the mobile terminal 13 performs a process for updating an address of a DNS placed close to the mobile terminal 13 in step S400.

The process in step S400 will be described in further detail.

The mobile terminal 13 forms a message for obtaining the address of the DNS connected to the internet 70, and a format of the message is based on a DHCP discovery message format for searching the DHCP server by an initial transaction among a usual DHCP process.

The DHCP discovery message format is well known to those skilled in the art, and therefore a further detailed description thereof will be omitted. However, an option for requesting the DNS address is provided for the DHCP discovery message, and the DNS address information is sampled by using the option in the exemplary embodiment of the present invention. At this time, when the mobile terminal 13 samples the DNS address information by using the DHCP discovery message, the message does not operate a DHCP client program but is used for one of functions of a mobile IP client. Accordingly, a process of a DHCP message subsequent to the DHCP discovery message does not proceed.

Accordingly, the mobile terminal 13 broadcasts the DHCP discovery message formed to sample the DNS address information to the internet through the FA 21 in steps S410, S412, and S414. As described, a destination address for broadcasting the DHCP discovery message becomes a broadcast address (255.255.255.255). Since the two DHCP servers 50 and 60 are connected to the internet in the exemplary embodiment of the present invention, the two DHCP servers 50 and 60 may receive the DHCP discovery message broadcasted from the mobile terminal 13.

The mobile terminal 13 initializes and operates a timer installed therein, and waits for a response message to the broadcasted DHCP discovery message in step S420.

When receiving no response message before the timer is canceled, the mobile terminal 13 determines to use the previously determined address information of the DNS 30, and ends the process for updating the DNS address.

When the DHCP servers 50 and 60 are connected to the internet 70 and receive the DHCP discovery message broadcasted from the mobile terminal 13, the DHCP servers 50 and 60 transmit a DHCP offer message including IP address, DNS address, and lease time information to the mobile terminal 13 through the internet in steps S 420, S420', S422, and S422'. At this time, other DHCP servers operate in a like manner of the DHCP servers 50 and 60 when the other DHCP servers are connected to the internet.

Accordingly, the mobile terminal 13 receives a response message at least from the DHCP servers 50 and 60 for a period of the timer, parses the received response message, and samples the DNS addresses in step S430. At this time, the mobile terminal 13 may sample the address of the DNS 30 by parsing the response message from the DHCP server 50, and sample the address of the DNS 40 by parsing the response message from the DHCP server 60. However, the response messages may not include the DNS address information according to features and establishment of corresponding DHCP servers since the response messages received by the mobile terminal 13 are messages received from arbitrary DHCP servers.

In addition, when sampling no address information since the DNS address information is not parsed among the response messages transmitted from the DHCP servers, the mobile terminal 13 determines to use the previously determined address information formation of the DNS 30, and ends the process for updating the DNS address.

The mobile terminal 13 selects a DNS having a minimum transmission delay due to a short distance to the FA 21 of the visiting network 20, among the DNSs of the addresses sampled in step S430. In further detail, the mobile terminal 13 confirms if the DNSs of the sampled addresses are alive in step S440, calculates a roundtrip delay in step S450 between the mobile terminal 13 and the DNSs obtained by the confirmation in step S440, and selects the DNS address having a minimum transmission delay in step S460.

At this time, an internet control message protocol (ICMP) for confirming accesses in a transmission control protocol/internet protocol (TCP/IP) environment is used to confirm if the DNSs of the sampled addresses are alive. The ICMP for controlling a message between a host server and an internet gateway and notifying errors is defined in RFC 792. The roundtrip delay denotes a period during which the mobile terminal 13 transmits a packet, a DNS of a corresponding address transmits a response packet to the packet transmitted by the mobile terminal 13, and the mobile terminal 13 receives the response packet.

In further detail, in the exemplary embodiment of the present invention, since the addresses sampled from the response message received by the mobile terminal 13 are addresses of the DNSs 30 and 40, the mobile terminal 13 transmits the ICMP message respectively to the DNSs 30 and 40 in steps S440, S440', S442, and S442', and receives the response messages from the DNSs 30 and 40 in steps S444, S444', S446, and S446'.

The mobile terminal 13 calculates the roundtrip delay for the DNS 30 when the response message arrives from the DNS 30, and the mobile terminal 13 calculates the roundtrip delay for the DNS 40 in step S450 and compares the two roundtrip delays when the response message arrives from the DNS 40. Since the DNS 30, compared to the DNS 40, is far from the mobile terminal 13 connected to the FA 21 of the visiting network 20 in the exemplary embodiment of the present invention, the roundtrip delay of the DNS 30 is calculated as great.

Accordingly, the mobile terminal 13 selects a DNS having a minimum roundtrip delay (i.e., DNS 40) in step S460.

Therefore, when the address of the DNS 40 close to the mobile terminal 13 is selected, the mobile terminal 13 changes a network establishment of the mobile terminal 13 according to the address information of the selected DNS 40 in step S500. More specifically, the address information of the DNS used by the mobile terminal 13 is updated to be the address information of the DNS 40.

As described, the mobile terminal 13 may establish the DNS address having the minimum transmission delay as a DNS address by using the normal DHCP message and ICMP.

While it has been described that a DNS address is updated after the mobile terminal performs the registration by moving from the home network 10 to the visiting network 20, the present invention is not limited to the disclosed embodiments since the DNS address may be updated when the mobile terminal 13 receives a service from the home network 10 or the visiting network 20. This is because the DHCP discovery and ICMP messages are available to be used while the mobile terminal 13 receives the service in a current network not after the mobile terminal moves to another network.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for updating a domain name server (DNS) address of a mobile terminal in a wireless mobile network based on a mobile internet protocol (IP), the method comprising:
    sampling, by the mobile terminal, at least one address of a domain name server (DNS) connected to the wireless mobile network, the sampling including broadcasting a message for sampling the at least one DNS address connected to the wireless mobile network, receiving a response message to the broadcasted message before a period of a predetermined timer is finished when the predetermined timer is initialized, and sampling a DNS address in the received message;
    determining if the response message is received before the period of the predetermined timer is finished;
    parsing the received response message and sampling the DNS address when the response message is received before the period of the predetermined timer is finished;
    calculating, by the mobile terminal, a roundtrip delay between the mobile terminal and the respective sampled DNSs;
    selecting, by the mobile terminal, a DNS address having a minimum roundtrip delay; and
    updating the DNS address of the mobile terminal to be the selected DNS address.

2. The method of claim 1, wherein, the broadcast message is a dynamic host configuration protocol (DHCP) discovery message formed in a DHCP message format, in which an option for requesting a DNS address is established.

3. The method of claim 1, wherein the DNS address established in the mobile terminal is used when no response message is received before the period of the predetermined timer is finished.

4. The method of claim 1, wherein the DNS address established in the mobile terminal is used when the response message received before the period of the predetermined timer is finished comprises no DNS address.

5. The method of claim 2, wherein the response message is a DHCP offer message transmitted from a DHCP server receiving the DHCP discovery message.

6. The method of claim 1, wherein the roundtrip delay is calculated by transmitting and receiving an internet control message protocol (ICMP) message for the sampled DNS address.

7. The method of claim 1, further comprising:
    prior to the sampling of the at least one DNS address, transmitting a message for requesting a mobile IP registration from the mobile terminal to a foreign agent in another network after moving from a current network to the other network, the current network being that to which the mobile terminal is connected; and
    receiving a message for allowing the mobile IP registration from the foreign agent in the other network.

8. The method of claim 7, wherein a registration request (RRQ) and registration reply (RRP) messages are used for the message for requesting the mobile IP registration and the message for allowing the same, the RRQ and RRP messages being mobile IP registration messages based on a request for comments (RFC) 2002 standard protocol of the Internet Engineering Task Force (IETF).

* * * * *